(12) United States Patent
Richardson, III et al.

(10) Patent No.: US 8,607,927 B2
(45) Date of Patent: *Dec. 17, 2013

(54) COMPOSITE FLAME BARRIER LAMINATE FOR A THERMAL AND ACOUSTIC INSULATION BLANKET

(75) Inventors: Llewellyn Bentley Richardson, III, Chesterfield, VA (US); Dariusz Wlodzimierz Kawka, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/325,770

(22) Filed: Dec. 14, 2011

(65) Prior Publication Data

US 2012/0321849 A1  Dec. 20, 2012

Related U.S. Application Data

(63) Continuation-in-part of application No. 12/759,741, filed on Apr. 14, 2010, now Pat. No. 8,292,027.

(60) Provisional application No. 61/171,163, filed on Apr. 21, 2009.

(51) Int. Cl.
| E04B 1/84 | (2006.01) |
| C08J 7/04 | (2006.01) |
| B32B 3/10 | (2006.01) |
| B32B 7/02 | (2006.01) |

(52) U.S. Cl.
USPC ........... 181/294; 428/138; 428/212; 428/213; 428/216; 428/341

(58) Field of Classification Search
USPC ........... 181/294; 428/138, 212, 213, 216, 341
See application file for complete search history.

(56) References Cited

U.S. PATENT DOCUMENTS

| 3,346,219 A | * | 10/1967 | Salyer et al. ............... 244/114 R |
| 3,841,954 A | * | 10/1974 | Lawler .......................... 428/102 |
| 4,698,267 A | * | 10/1987 | Tokarsky .................... 428/474.4 |
| 4,729,921 A | * | 3/1988 | Tokarsky ...................... 428/326 |
| 4,810,565 A | * | 3/1989 | Wasitis et al. ................. 428/215 |
| 5,026,456 A | * | 6/1991 | Hesler et al. .................. 162/146 |
| 5,084,136 A | * | 1/1992 | Haines et al. ..................... 162/9 |
| 5,223,094 A | * | 6/1993 | Kirayoglu et al. ............ 162/145 |
| 5,314,742 A | * | 5/1994 | Kirayoglu et al. ............ 442/378 |
| 6,322,022 B1 | * | 11/2001 | Fay et al. ...................... 244/121 |

(Continued)

OTHER PUBLICATIONS

Khang D. Tran, Light Weight Fire Barrier Materials for Aircraft Fuselage Thermal/ Acoustical Insulation; The Mexmil Company, Santa Ana, California, USA.

*Primary Examiner* — David Warren
*Assistant Examiner* — Christina Russell

(57) ABSTRACT

A multilayer laminate comprising a first polymeric film layer capable of withstanding a temperature of at least 200 C for at least 10 min, a first adhesive layer having an areal weight of from 2 to 40 gsm capable of activation at a temperature of from 75 to 200 degrees C., an inorganic refractory layer, a second adhesive layer having an areal weight of from 4 to 40 gsm capable of activation at a temperature of from 75 to 200 degrees C. and a second polymeric film layer capable of withstanding a temperature of at least 200 C for at least 10 min, wherein at least one of the first or second polymeric film layers is thermoplastic.

15 Claims, 1 Drawing Sheet

(56) References Cited

U.S. PATENT DOCUMENTS

| | | | | |
|---|---|---|---|---|
| 6,565,040 B2* | 5/2003 | Fay et al. | | 244/121 |
| 6,627,561 B1* | 9/2003 | Wulliman et al. | | 442/1 |
| 6,670,291 B1* | 12/2003 | Tompkins et al. | | 442/136 |
| 2004/0211506 A1* | 10/2004 | Wang et al. | | 156/89.11 |
| 2007/0155265 A1* | 7/2007 | Anderson | | 442/35 |
| 2010/0024969 A1* | 2/2010 | Wang et al. | | 156/239 |
| 2010/0159221 A1* | 6/2010 | Kourtakis et al. | | 428/216 |
| 2010/0173152 A1* | 7/2010 | Beraud et al. | | 428/361 |
| 2010/0209679 A1* | 8/2010 | Tompkins | | 428/201 |
| 2011/0094826 A1* | 4/2011 | Richardson et al. | | 181/294 |
| 2011/0114342 A1* | 5/2011 | Ono et al. | | 169/45 |
| 2012/0003451 A1* | 1/2012 | Weigel et al. | | 428/213 |
| 2012/0128959 A1* | 5/2012 | Fernando et al. | | 428/219 |
| 2012/0321848 A1* | 12/2012 | Richardson, III et al. | | 428/138 |
| 2012/0321849 A1* | 12/2012 | Richardson et al. | | 428/138 |
| 2012/0321868 A1* | 12/2012 | Richardson et al. | | 428/216 |
| 2012/0321883 A1* | 12/2012 | Richardson et al. | | 428/341 |

\* cited by examiner

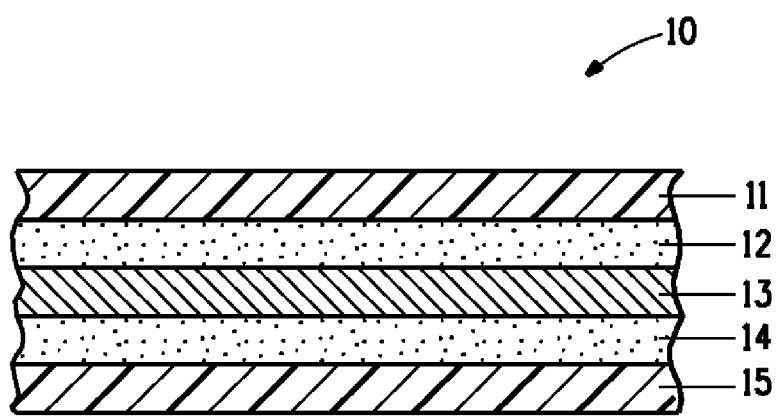

COMPOSITE FLAME BARRIER LAMINATE FOR A THERMAL AND ACOUSTIC INSULATION BLANKET

This application is a continuation in part of application Ser. No. 12/759,741 filed on Mar. 14, 2010 which claims priority from provisional filing application No. 61/171,163 filed on Apr. 21, 2009.

BACKGROUND OF THE INVENTION

1. Field of Invention

This invention pertains to a composite laminate having flame resistant properties. The invention also covers use of the composite laminate in a thermal and acoustic blanket as may be found in an aircraft fuselage or a turbine engine compartment.

2. Background of the Invention

U.S. Pat. No. 6,322,022 to Fay et al. discloses burnthrough resistant systems for transportation especially aircraft.

U.S. Pat. No. 6,670,291 to Tomkins and Vogel-Martin describes a laminate sheet material for flame barrier layer applications.

There remains an ongoing need for thermal and acoustic blankets for aircraft structures having reduced weight and improved resistance to flame spread.

SUMMARY OF INVENTION

This invention is directed to a multilayer laminate for use as a flame barrier comprising:
(i) a first polymeric film layer capable of withstanding a temperature of at least 200 C for at least 10 min,
(ii) a first adhesive layer having an areal weight of from 2 to 40 gsm capable of activation at a temperature of from 75 to 200 degrees C.,
(iii) an inorganic refractory layer,
(iv) a second adhesive layer having an areal weight of from 2 to 40 gsm capable of activation at a temperature of from 75 to 200 degrees C., and
(v) a second polymeric film layer capable of withstanding a temperature of at least 200 C for at least 10 min, wherein at least one of the first or second polymeric film layers is thermoplastic.

BRIEF DESCRIPTION OF DRAWINGS

FIG. 1 is a schematic cross section through a burnthrough resistant composite laminate of this invention.

DETAILED DESCRIPTION OF THE INVENTION

FIG. 1 shows a section through a burnthrough resistant composite laminate 10 comprising a first polymeric film layer 11, a first adhesive layer 12, an inorganic refractory layer 13, a second adhesive layer 14 and a second polymeric film layer 15.

Polymeric Film Layer

At least one of the first or second polymeric film layers is thermoplastic. The other polymeric layer may be thermoset. Preferably both polymeric layers are thermoplastic. The polymeric film layers must be capable of withstanding a temperature of at least 200 C for at least 10 min.

Preferably the film layer has a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguished within ten seconds after the ignition source is removed.

A further requirement of the film layer is that it should have a thickness in the range of from 4 to 30 micrometers. More preferably the thickness range should be from 5 to 15 micrometers and most preferably in the range from 5 to 7 micrometers. The film layer provides mechanical strength and stiffness to the laminate.

Suitable film layer materials are polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are examples of fluoropolymers. A suitable fluoropolymer is available from E.I. du Pont de Nemours, Wilmington, Del. under the tradename Tedlar. Polyarylate is an example of a suitable liquid crystal polymer. Some of these films may also be coated with a second polymeric material. For example, a polyimide film, Kapton®, may be coated with fluorinated ethylene propylene, FEP and used in this invention.

In a preferred embodiment, the film layers are PEEK or PEKK.

The surface of the film layer may optionally be treated to improve adhesion with another substrate such as an adhesive. Suitable surface treatment methods include, but are not limited to, corona etching and washing with coupling agents such as ammonium, phosphonium or sulfonium salts.

In some embodiments, the film layer is metalized on at least one surface. In some embodiments, the metalized surface is in contact with the adhesive layer.

Adhesive Layer

The first and second adhesive layers are shown in FIG. 1 at 12 and 14 respectively. The layers separate the first and second polymeric film layers from the refractory layer.

The adhesive layer may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred.

One of the objectives for having a high temperature polymeric film adhesively bonded to a refractory layer is to provide mechanical reinforcement and protection to the overall composite laminate during manufacturing, installation and service.

To prevent possible damage from mechanical stressing exerted by a shrinking/melting/disintegrating polymeric film on an inorganic refractory film-like layer it is preferred that inter-ply bond of the composite laminate would fail (i.e. release/melt/soften) in the early stage of the flame exposure thus causing internal de-bonding of the composite laminate (i.e. delamination of the refractory layer from the polymeric film) before the polymeric film starts disintegrating. Due to their relatively low activation temperatures, thermoplastic adhesives are a preferred choice over thermoset adhesives for this application.

The adhesive layer may optionally contain up to 40 weight percent of a flame retardant ingredient. Suitable flame retardant ingredients include antimony trioxide, halogenated flame retardants including tetrabromobisphenol A, polybrominated biphenyls, Penta-, Octa-, Deca-brominated diphenyl ether (oxide) and hexabromocyclododecane. Phosphorus containing flame retardants are also widely used.

The adhesive must be capable of activation at a temperature in the range of 75 to 200 degrees C. In some embodiments, the activation range is from 120 to 140 degrees C. By activation we mean that for a thermoset resin, the resin must bond to the polymeric film layer and the refractory layer within the specified temperature range. For a thermoplastic resin, activation means that the resin softens and flows sufficiently to bond to the polymeric film layer and the refractory layer. The adhesive bond between the inorganic refractory layer and the first polymeric film is at least 0.5 lb/in. In some embodiments, the adhesive bond between the inorganic refractory layer and the first polymeric film is at least 0.8 lb/in. The adhesive bond between the inorganic refractory layer and the second polymeric film is at least 0.25 lb/in. In some embodiments, the adhesive bond between the inorganic refractory layer and the second polymeric film is at least 0.8 lb/in.

The adhesive layer weighs from 2 to 40 gsm. In some embodiments the adhesive layer weighs from 3 to 15 gsm or even from 5 to 10 gsm. If the adhesive weight is below 2 gsm, the bond strength will be too weak. If the adhesive weight is greater than 40 gsm, unnecessary weight will be added.

Refractory Layer

The inorganic refractory layer is on the opposite side of the adhesive layer from the polymeric film layer as is shown at 13 in FIG. 1.

The refractory layer has a dry areal weight of from 15 to 50 gsm and a residual moisture content of no greater than 10 percent by weight, In some embodiments, the refractory layer has a dry areal weight of from 20 to 35 gsm and a residual moisture content of no greater than 3 percent by weight. The layer The refractory layer comprises platelets. Preferably at least 85% of the layer comprises platelets, more preferably at least 90% and most preferably at least 95%. In some embodiments, platelets comprise 100% of the layer. The refractory layer may comprise some residual dispersant arising from incomplete drying of the platelet dispersion during manufacture.

In some embodiments, the refractory layer has a thickness of from 7.0 to 76 micrometers and more preferably from 7.0 to 50 micrometers. In some embodiments, the refractory layer has a UL 94 flame classification of V-0. The function of the refractory layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is a preferred platelet material. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% $MgO$, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms. The aspect ratio of an individual platelet typically ranges from 100 to 20,000.

In some embodiments of this invention, the inorganic platelet layer is reinforced by a lightweight open weave fabric scrim either laid onto a single platelet layer or placed between two layers of platelets so as to provide additional mechanical strength to the layer. The scrim can be made from natural, organic or inorganic fibers with glass, cotton, nylon or polyester being typical examples. A glass fiber scrim is particularly preferred. The scrim may be a woven or knit structure and has a typical areal weight not exceeding 40 grams per square meter.

In some embodiments, the refractory layer is perforated to enhance bonding to the adhesive layer. With a perforated refractory layer, the adhesive bond between the refractory layer and the polymeric film is at least 1.0 lb/in. The extent of perforation is determined by experimentation for each laminate assembly. In order to prevent compromising flame barrier properties, an individual perforation should not exceed 2 millimeters in maximum dimension. In a preferable embodiment, individual perforations should be spaced at least 10 millimeters apart. The shape of the perforations is not critical, Suitable perforations include circles, squares, rectangles, ovals and chevrons.

A refractory layer comprising platelets as herein described provides a nonporous, flexible, film-like sheet or coating. The platelet layer is also thin, dense and has a very smooth and tough surface, attributes that assist in the heat sealing process when the laminate comprising the refractory layer is used in a thermal blanket. A refractory layer comprising ceramic fibers is much more porous, brittle, and friable.

In a preferred embodiment, the refractory layer further comprises cations arising from contact, at a temperature of from 10 to 50 degrees C., with an aqueous cationic rich solution at a cation concentration of from 0.25 to 2N. The contact with the cationic solution occurs prior to assembling the refractory layer into the composite laminate. This cationic treatment provides enhanced stability to the refractory layer on exposure to fluids.

Flame Barrier

The composite laminate as described above may be used as a flame barrier layer. In a preferred embodiment, the first polymeric film is facing outwards, that is, away from the object being protected. Flame barrier layers find use in applications in vehicles or building structures such as aircraft, trains, boats and offshore rigs where the flame barrier layers may be found in ceiling, sidewall and floor panels. For aircraft, other uses are in cargo liners and thermal acoustic blankets.

Thermal Acoustic Blanket

The flame barrier as described above may be used as a component in a thermal insulation and acoustic blanket. An example of such a blanket is described in United States Patent Application publication number 2007/0155265 to Anderson. FIGS. 2 and 3 of this publication show at 16 a fire-retardant barrier layer. The flame barrier layer of this invention could replace the flame barrier layers described in the Anderson publication.

TEST METHODS

The 5-layer composite laminates were subjected to a flame test that replicated the temperature and air mass flux test conditions of test method FAA FAR 25.856(b), App. F, Part VII. Somewhat lower heat flux was compensated with a higher air mass flux to replicate a required thermo-mechanical stress level to be exerted on the composite flame barrier laminates during the burn-through test.

EXAMPLES

All parts and percentages are by weight unless otherwise indicated. All temperatures are in degrees C. unless otherwise indicated.

Inorganic Refractory Material

The inorganic refractory material used in all the Examples was vermiculite. The vermiculite grade was a high solids version of an aqueous dispersion of Microlite® 963 having an "as supplied" solids content of 7.5 percent. The dispersion was obtained from W.R. Grace and Co, Cambridge, Mass. The vermiculite dispersion used in all the Examples was concentrated to a solids content of 10.7+/−0.1 weight percent.

Release Paper

The release paper used in all Examples was 11 mil thick hydrophilic gray RagKraft paper comprising a blend of 50 weight percent of cellulose fibers and 50 weight percent of cotton fibers. The paper was obtained from Crocker Technical Papers, Fitchburg, Mass. The paper had a basis weight of 8.1 oz/sq. yd., an average thickness of 11.0 mil, a density of 1.0 g/cu·cm., a Gurley Air Resistance of 714 sec/100 cc, 20 oz. cyl., a smoothness of 103 Sheffield units, a dry tensile strength of 122.0 lb/in. in the machine direction and 40.0 lb./in. in the cross direction. The wet tensile strength was 6.4 lb./in. in the machine direction and 2.5 lb./in. in the cross direction.

Preparation of an Inorganic Refractory Layer on a Film

Vermiculite dispersion concentrated to a solids content of 10.6 weight percent was coated on 2 mil thick metalized polyester film using a slot die coating system to form a refractory layer on the film. The film was metalized on one side. The coating was applied to the metalized side of the film. The film was obtained under the tradename Mylar from E.I. DuPont de Nemours and Co., Wilmington, Del. The coated film was dried in an oven at a temperature cycle of 15 minutes at 60 degrees, 15 minutes at 71 degrees, 15 minutes at 82 degrees, 15 minutes at 93 degrees, and over 15 minutes at 99 degrees. The refractory layer had a dry coat weight of 35 gsm and a moisture content of below 5%. After drying, the film layer was separated from the refractory layer and both layers were wound up on separate rolls.

Preparation of an Inorganic Refractory Layer on a Release Paper

Vermiculite dispersion concentrated to a solids content of 10.8% weight percent was coated on RagKraft release paper using a slot die coating system to form a refractory layer on the paper. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 33 gsm.

Polymeric Films

The polymeric film used as the first and second polymeric films in all examples was a 6 micron thick polyetheretherketone (PEKK) film grade DS-E obtained from Cytec Industries, Woodland Park, N.J.

Adhesives

The following adhesives were used to make the three layer laminate. Bostik brand products were obtained from Bostik Inc., Wauwatosa, Wis.

Ref (a)—Bostik 10-669-3, a 3 mil Phenoxy Urethane thermosetting 132 gsm film adhesive.

Ref (b)—Bostik LADH 402, a solvent-based polyamide flameretardant thermoplastic liquid adhesive.

Ref (c)—Bostik L7132R-75/Boscodur 24T, a two-component solvent based thermosetting liquid adhesive system This is a linear saturated polyester based adhesive (L7132R), with polyisocyanate (Boscodur 24T) as a curing agent.

Lamination Equipment

For all Examples, a flat-bed double-belt laminator with a Teflon coated fiberglass belt was used to form the composite laminates. The lamination temperatures in the 9 foot long pre-nip heating section were 70 to 90 degrees in zone 1, 90 to 110 degrees in zone 2 and 130 to 150 degrees in zone 3.

The lamination temp in the 3 foot long post-nip cooling section was 50 to 70 degrees in zone 4.

The force applied by the belt on a sample size of 400 square centimeters was 5 kN. The machine line speed was 2 m/min.

Example 1

The same adhesive was used as the first and second adhesives. The adhesive used, LADH 402 (Ref. (b)), was deposited on the surface of the PEKK film, the first polymeric film, using a Gardco Adjustable Micrometer "Microm II" Film Applicator. After deposition, samples of the coated film were dried in a conventional oven at 80 degrees for 10 minutes to allow the solvent in the adhesive to evaporate. The weight of adhesive deposited on the surface of the polymeric film was 8 gsm.

The adhesive coated film was bonded to the refractory layer on a release paper in the double-belt laminator with the adhesive contacting the exposed refractory surface to form 3-layer composite laminate. The release paper was removed from the laminate and, in the double-belt laminator, the 3-layer laminate was bonded to the second polymeric film by the second adhesive such that the second adhesive contacted the exposed refractory surface to form final 5-layer composite laminate. The laminate comprised in order a first polymeric film, a first adhesive layer, an inorganic refractory layer, a second adhesive layer and a second polymeric film. The laminate weight was 65 gsm.

When exposed to a flame, sample showed a good resistance to flame propagation, with inorganic refractory layer acting as an effective flame barrier.

Example 2

This example was similar to Example 1 except that the thermosetting adhesive (Ref. (c)) was used as the first and second adhesives.

Curative 24T was mixed with 7132R resin with mixing ratio of 20-24 volumes of 7132R to 1 volume of 24T. After blending into a homogenous solution it was immediately deposited on the polymeric film and dried in an oven to allow solvent to evaporate. The weight of the adhesive deposited on the surface of the polymeric film was 8 gsm.

The bonding process was as in Example 1. The laminate comprised in order a first polymeric film, a first adhesive layer, an inorganic refractory layer, a second adhesive layer and a second polymeric film. The laminate weight was 65 gsm.

On completion of bonding, the 5-layer laminate was exposed to a flame. The test sample showed a good resistance to flame propagation with inorganic refractory layer acting as an effective flame barrier.

Example 3

This was similar to Example 1 except that, prior to lamination, the 35 gsm refractory layer had been coated onto polyester film and subsequently separated from the film to give an unsupported refractory layer.

The bonding process was as in Example 1. The laminate comprised in order a first polymeric film, a first adhesive layer, an inorganic refractory layer, a second adhesive layer and a second polymeric film.

On completion of bonding, the 5-layer laminate was exposed to a flame. The test sample showed a good resistance to flame propagation with inorganic refractory layer acting as an effective flame barrier. The laminate weight was 65 gsm.

A general observation was that during the bonding step in the double belt laminator, it was more difficult to handle an unsupported refractory layer than one supported by a release paper.

Example 4

Prior to lamination, the 35 gsm refractory layer had been coated onto polyester film and subsequently separated from the film to give an unsupported refractory layer.

The first and second adhesive was Bostik 10-669-3 (Ref. (a)).

In this Example a single step bonding process in the double-belt laminator was used to a 5-layer laminate. Materials were laid up into an assembly in the sequence of a first polymeric film, a first adhesive layer, an inorganic refractory layer, a second adhesive layer and a second polymeric film. This assembly was then run through the laminator thus bonding the 5-layers into a unitary structure. The laminate weight was 315 gsm.

On completion of bonding, the 5-layer laminate was exposed to a flame. The test sample showed a good resistance to flame propagation with inorganic refractory layer acting as an effective flame barrier. With the exception of a significantly higher weight of the final 5-layer laminate of Example 4, the findings were very similar to those for Example 3. For some applications, the relatively high weight of Example 4 at 315 gsm when compared to Example 3 at 65 gsm is a significant disadvantage.

Example 5

This was similar to Example 1 except that, after coating and drying, the 33 gsm refractory layer on a release paper was treated, at ambient conditions, with an aqueous cationic rich solution.

The coated release paper was immersed for one minute in a cation rich solution of sodium chloride dispersed in water at 0.5N concentration then air dried at 24 degrees C. for 2 minutes followed by additional drying for 30 minutes inside a conventional oven heated to 80 degrees C.

Once dried to about 3% moisture content, the cation treated material was removed from the oven. Excess dry sodium chloride that had accumulated on the outer surfaces of the refractory layer and the release paper was carefully wiped off with a dry soft cloth.

The cation treated refractory layer on release paper was then adhesively bonded to PEKK film (Ref. 1) to form a 5-layer laminate in the same manner as Example 1.

When compared to a non-cation treated refractory layer, the cation treated layer showed a significantly improved stability when exposed to either high humidity conditions for a prolonged time such as 120 hours inside an aging chamber at 80 degrees C. and 90% RH or after immersion in water for at least 10 minutes. Other findings were similar to those of Example 1.

What is claimed is:

1. A multilayer laminate for use as a flame barrier comprising
   (i) a first polymeric film layer capable of withstanding a temperature of at least 200 C for at least 10 min,
   (ii) a first adhesive layer having an areal weight of from 2 to 40 gsm capable of activation at a temperature of from 75 to 200 degrees C.,
   (iii) an inorganic refractory layer,
   (iv) a second adhesive layer having an areal weight of from 2 to 40 gsm capable of activation at a temperature of from 75 to 200 degrees C., and
   (v) a second polymeric film layer capable of withstanding a temperature of at least 200 C for at least 10 min, wherein at least one of the first or second polymeric film layers is thermoplastic;
      wherein the inorganic refractory layer of (iii) comprises platelets in an amount of 100% by weight with a dry areal weight of 15 to 50 gsm and a residual moisture content of no greater than 10 percent by weight.

2. The laminate of claim 1 wherein the inorganic refractory layer comprises vermiculite.

3. The laminate of claim 1 wherein the inorganic refractory layer is perforated.

4. The laminate of claim 3 wherein the adhesive bond between inorganic refractory layer and either polymeric film is at least 1.0 lb/in.

5. The laminate of claim 4 wherein the adhesion bond between inorganic refractory layer and either polymeric film is at least 1.5 lb/in.

6. The laminate of claim 1 wherein the first and second polymeric film layer is a fluoropolymer, polyimide, polyetheretherketone, or polyetherketoneketone.

7. The laminate of claim 1 wherein the first and/or second polymeric film layer is metalized on at least one surface.

8. The laminate of claim 1 wherein either the first or second or both adhesive layers optionally contain up to 40 weight percent of a flame retardant ingredient.

9. The laminate of claim 1 wherein the adhesion bond between the inorganic refractory layer and the first polymeric film is at least 0.5 lb/in.

10. The laminate of claim 9 wherein the adhesion bond between the inorganic refractory layer and the first polymeric film is at least 0.8 lb/in.

11. The laminate of claim 1 wherein the adhesive bond between the inorganic refractory layer and the second polymeric film is at least 0.25 lb/in.

12. The laminate of claim 11 wherein the adhesion bond between the inorganic refractory layer and the second polymeric film is at least 0.8 lb/in.

13. The laminate of claim 1 wherein the inorganic refractory layer has a dry areal weight of from 20 to 35 gsm.

14. The laminate of claim 1 wherein the inorganic refractory layer has a moisture content of no greater than 3%.

15. A flame barrier layer in a vehicle or building structure comprising the multilayer laminate of claim 1.

* * * * *